(12) United States Patent
Gupta

(10) Patent No.: US 11,507,559 B2
(45) Date of Patent: Nov. 22, 2022

(54) OBJECT SHARING BY ENTITIES USING A DATA STRUCTURE

(71) Applicant: HEWLETT PACKARD ENTERPRISE DEVELOPMENT LP, Houston, TX (US)

(72) Inventor: Sumit Gupta, San Jose, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 242 days.

(21) Appl. No.: 16/882,590

(22) Filed: May 25, 2020

(65) Prior Publication Data
US 2021/0365429 A1    Nov. 25, 2021

(51) Int. Cl.
G06F 16/00    (2019.01)
G06F 16/23    (2019.01)

(52) U.S. Cl.
CPC ............................... *G06F 16/2343* (2019.01)

(58) Field of Classification Search
CPC .................................................. G06F 16/2343
See application file for complete search history.

(56) References Cited

U.S. PATENT DOCUMENTS

| | | | |
|---|---|---|---|
| 6,581,063 B1 | 6/2003 | Kirkman | |
| 6,664,736 B1 | 12/2003 | Pakkala et al. | |
| 6,826,757 B2 | 11/2004 | Steele et al. | |
| 6,977,847 B2 | 12/2005 | Lasser et al. | |
| 6,988,180 B2 | 1/2006 | Kadatch et al. | |
| 6,993,770 B1 | 1/2006 | Detlefs et al. | |
| 7,194,495 B2 | 3/2007 | Moir et al. | |
| 7,243,088 B2 | 7/2007 | Verma et al. | |
| 9,477,471 B1 * | 10/2016 | Iyer ......................... G06F 9/544 |
| 2001/0056420 A1 | 12/2001 | Steele, Jr. et al. | |
| 2003/0140085 A1 | 7/2003 | Moir et al. | |
| 2005/0149615 A1 | 7/2005 | Nedimyer et al. | |
| 2007/0185943 A1 | 8/2007 | Bacon et al. | |
| 2008/0256074 A1 * | 10/2008 | Lev ......................... G06F 9/466 |
| 2010/0332818 A1 * | 12/2010 | Prahlad ................. G06F 3/0605 |
| | | | 709/217 |
| 2011/0246727 A1 | 10/2011 | Dice et al. | |
| 2013/0317944 A1 * | 11/2013 | Huang ..................... H04W 4/02 |
| | | | 455/457 |

(Continued)

FOREIGN PATENT DOCUMENTS

WO    WO-2014184758 A2 *  11/2014  ......... G06Q 30/0218

OTHER PUBLICATIONS

Anil M, et al.; "Can I read/write shared 128 bit floats without locks?"; available online at <https://software.intel.com/en-us/forums/intel-isa-extensions/topic/622376>; Mar. 2016; 8 pages.

(Continued)

*Primary Examiner* — Syed H Hasan
(74) *Attorney, Agent, or Firm* — Trop, Pruner & Hu, P.C.

(57) ABSTRACT

In some examples, a system provides a data structure containing an entry to store information for an object for sharing by a plurality of entities. The system allocates the object to a first entity of the plurality of entities based on an atomic access of the entry, the atomic access to update, in one operation, multiple information elements in the entry relating to allocation of the object. The system returns, to the first entity, a handle to the object, the handle based on a value in the entry.

20 Claims, 4 Drawing Sheets

(56) References Cited

U.S. PATENT DOCUMENTS

| | | | | |
|---|---|---|---|---|
| 2014/0282109 | A1* | 9/2014 | Wenger | H04L 65/1089 715/753 |
| 2015/0134602 | A1* | 5/2015 | Nicholas | G06F 16/23 707/609 |
| 2015/0143064 | A1* | 5/2015 | Bhargava | G06F 11/1464 711/162 |
| 2019/0075271 | A1* | 3/2019 | Orfaig | H04N 5/378 |
| 2020/0285655 | A1* | 9/2020 | Kaushik | G06F 16/275 |

OTHER PUBLICATIONS

Harry et al.; "Deleting a file with I/O in progress: Is it a filesystem and/or an OS feature?"; Stack Overflow; available online at <https://stackoverflow.com/questions/50228132/deleting-a-file-with-i-o-in-progress-is-it-a-filesystem-and-or-an-os-feature>; May 2018; 6 pages.
Intel Corporation; "Intel® 64 and IA-32 Architectures Software Developer's Manual"; vol. 3 (3A, 3B, 3C & 3D): System Programming Guide, Chapter 8: Multiple-Processor Management; Order No. 325384-071US; Oct. 2019; 60 pages.
Michael, M. M.; "Safe Memory Reclamation for Dynamic Lock-Free Objects Using Atomic Reads and Writes"; Proceedings of the twenty-first annual symposium on Principles of distributed computing; Jul. 2002; pp. 1-10.
Michael, M.M., Scalable Lock-Free Dynamic Memory Allocation, PLDI 2004 (12 pages).
Valois, J.D.; "Lock-free Linked Lists Using Compare-and-swap"; PODC 1995; 9 pages.
Watt, J. et al.; "Set delete pending flag instead delete_on_close"; available online at <https://community.osr.com/discussion/240183/set-delete-pending-flag-instead-delete-on-close>, Mar. 2013; 6 pages.
Wikipedia, ABA problem last edited May 11, 2020 (5 pages).

* cited by examiner

OBJECT SHARING BY ENTITIES USING A DATA STRUCTURE

BACKGROUND

A computer system can include various entities that can access objects of the system. In some cases, an object may be shared by multiple entities. For example, the object may be part of a workflow in the system, where different entities perform respective different processing of the object in the workflow.

BRIEF DESCRIPTION OF THE DRAWINGS

Some implementations of the present disclosure are described with respect to the following figures.

Figure 1:
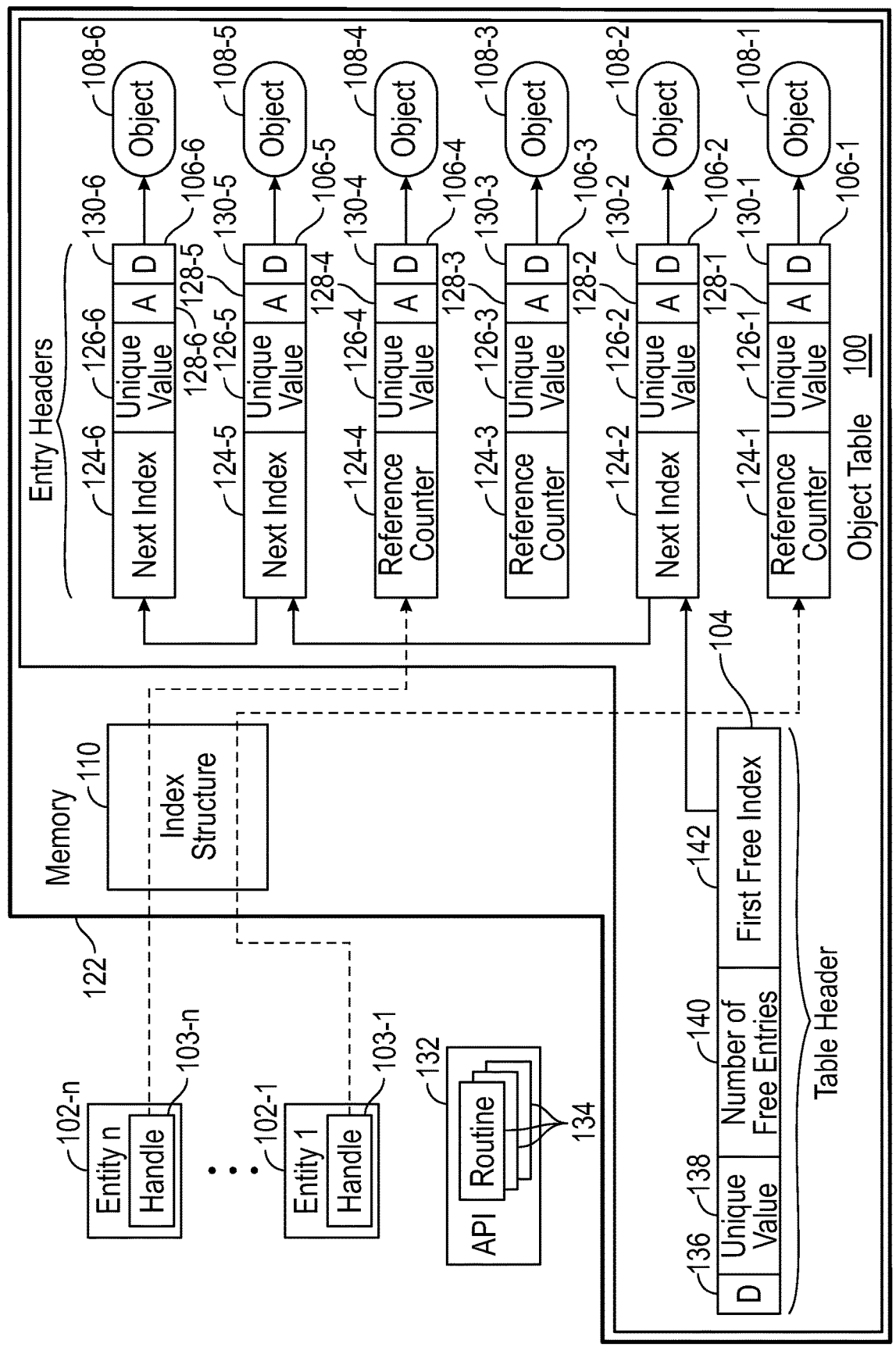
FIG. 1 is a block diagram of an object table according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "computer system" can include a computer or multiple computers. A "computer" can refer to a server computer, a desktop computer, a notebook computer, a tablet computer, a storage server, a communication node (e.g., a switch, a router, etc.), an appliance, a vehicle or a controller in the vehicle, and so forth.

Entities in the computer system that can access objects can include services, such as services associated with application programs or other types of machine-readable instructions. In some examples, services can include microservices, which can arrange an application program as a collection of loosely coupled services. Entities that are able to access objects can also include electronic hardware components, such as a processor, an input/output (I/O) device, and so forth.

As used here, an "object" can refer to any information item that is capable of being accessed or used by an entity. Examples of objects can include any or some combination of the following: a storage volume (which is a logical unit of storage for storing data), a data file, a command, metadata, and so forth.

A workflow can be performed in which different entities can access the same object to perform different processes with respect to the object. Such an object is shared by the different entities, which may be services that are run as different threads or different processes. In some cases, the services may also be part of separate hardware systems or separate virtual systems. An example workflow can involve a first entity performing an input/output (I/O) operation that retrieves metadata (an example of an "object") of data that is being written to a storage system, a second entity that retrieves the metadata to perform compression of the data, a third entity that retrieves the metadata to perform deduplication of the data, and so forth. Other example workflows are contemplated in other scenarios.

During the workflow, an entity that has accessed a shared object may stop, go offline, or restart, which can lead the entity to drop references to the shared object. For example, an entity that has crashed and restarted may lose the context associated with the execution of the entity. Losing its context may cause the entity to no longer have knowledge of commands that have already been executed by the entity.

Moreover, in some cases, an entity that is performing an operation on a shared object may block other entities from accessing the shared object, which can cause an indeterminate amount of delay in access of the shared object by the other entities. For example, locks may be employed by entities when accessing a shared object. When a first entity wishes to access the shared object, the first entity can acquire a lock on the shared object, which effectively prevents other entities from accessing the shared object until the first entity has released the lock. While the lock is in place, the other entities can experience a delay in their operations.

In accordance with some implementations of the present disclosure, objects can be shared by multiple entities in the computer system in a lock-free manner and without blocking of access of the objects by other entities. Such lock-free and non-blocking sharing of objects can be achieved by using an object allocation and management tracking data structure that includes entries that can be accessed using an atomic operation, where an update of information elements of each entry in the atomic operation can be performed in one operation. By using atomic operations to access each entry of the data structure allows for a lock-free implementation in which locks do not have to be acquired when accessing objects referred to by the entries of the data structure. Moreover, by being able to update multiple information elements of each entry in a single operation, the access of the entry can be performed without blocking.

In some examples, the ability to update information elements of a data unit (such as an entry of the data structure noted above) depends on the capability of a processor. For example, some processors may be able to update multiple information elements of a 16-byte data unit in a single atomic operation; in other words, a processor is able to access and update any combination of information elements in the 16-byte data unit in one operation without interruption or intervention. Different processors may have different capabilities of performing single atomic operations of data units of different lengths (e.g., less than 16 bytes or more than 16 bytes). An "information element" of a data unit that can be accessed and updated can refer to a collection of bits or bytes, where a collection can include a single bit or multiple bits, or a single byte or multiple bytes.

Lock-free access of a shared object can refer to an ability of multiple entities to access the same shared object without performing mutual exclusion due to use of a lock on the shared object, i.e., each of the multiple entities is able to access the shared object even though another entity is accessing the shared object.

An access of the shared object is non-blocking if a delay of a first entity that is accessing the object (such as due to a fault, error, or any other type of delay) does not affect any other entity in completing the other entity's operation on the object.

FIG. 1 shows an example of object table 100 that tracks allocation and referencing of objects by entities 102-1 to 102-n, where n 2. More generally, the object table 100 is an example of an object allocation and management data structure including a number of entries that store information to indicate allocations of objects and referencing of objects by the entities 102-1 to 102-n.

In other examples, object allocation and management data structures can have formats different from a table.

There can be multiple object tables 100 in a computer system, where an object table 100 of the multiple object tables is associated with a respective type of object (e.g., a type of command, a type of metadata, etc.). Thus, the multiple object tables 100 can be maintained for objects of respective different types. The objects referenced by a given object table 100 that can be allocated are of the respective object type. For example, if the given object table 100 is associated with a given command type (e.g., a deduplication command used to deduplicate data), then this give object table 100 can be accessed by the entities 102-1 to 102-n to invoke respective instances of the deduplication command.

In the example of FIG. 1, the entries of the object table 100 include a table header 104 and entry headers 106-1, 106-2, 106-3, 106-4, 106-5, and 106-6. As shown in FIG. 1, each entry header is associated with a respective object. As shown, the entry headers 106-1, 106-2, 106-3, 106-4, 106-5, and 106-6 are associated with corresponding objects 108-1, 108-2, 108-3, 108-4, 108-5, and 108-6.

Although six entry headers are shown in FIG. 1, it is noted that in other examples, the object table 100 can include more than six entry headers or less than six entry headers. The number of entry headers included in the object table 100 is based on a maximum number of objects that a computer system is expected to allocate.

Any object 108-$i$ ($i$=1-6 in FIG. 1) can be accessed by one entity or by multiple entities. When accessed by multiple entities, the object 108-$i$ is considered to be shared by the multiple entities.

An index structure 110 includes entries that contain indexes to the corresponding entry headers 106-1 to 106-6. In some examples, the object table 100 is a stored in a memory 122, where a memory can include volatile storage such as a dynamic random access memory (DRAM), a static random access memory (SRAM), and so forth. A memory can be implemented using one memory device or multiple memory devices. The index structure 110 can also be stored in the memory 122 or another storage.

In some examples, a pre-allocated portion of the memory 122 is used for storing the object table 100. The size of the pre-allocated memory portion for storing the object table 100 is based on the maximum number of objects that a computer system expects to allocate. Each object has a certain size (different objects may have the same size or may have different sizes), and each entry header 106-$i$ also has a specified length (e.g., 16 bytes or another example length).

The object table 100 also includes the table header 104, which can also be 16 bytes in length (or can have a different length in another example). Thus, the pre-allocated memory portion can have a size sufficient to store the table header 104, the entry headers 106-1 to 106-6, and the objects 108-1 to 108-6 (assuming an example where the expected maximum number of objects to be allocated is six).

Each entry header 106-$i$ can store information to indicate whether or not a corresponding object 108-$i$ has been allocated or is unallocated (i.e., free for allocation). An object being "allocated" refers to the object being reserved for access by an entity (or by multiple entities). The information elements of each entry header 106-$i$ include a reference field 124-$i$, a unique value 126-$i$, an allocation indicator 128-$i$, and a drain indicator 130-$i$. In further examples, each entry header 106-$i$ can include additional or alternative information elements, including a reserved field.

The allocation indicator 128-$i$ can be implemented using a bit or a number of bits. If the allocation indicator 128-$i$ is set to an active state (e.g., a logical "1"), then that indicates the corresponding object 108-$i$ has been allocated. On the other hand, if the allocation indicator 128-$i$ is set to an inactive state (e.g., a logical "0"), then that indicates the corresponding object 108-$i$ is free (i.e., is currently unallocated).

The content of the reference field 124-$i$ differs depending upon whether the corresponding object 108-$i$ has been allocated or is free (currently unallocated).

In the example of FIG. 1, the object 108-1 has been allocated, and thus, the reference field 124-1 in the entry header 106-1 includes a reference counter. The reference counter is advanced (e.g., incremented) each time the corresponding object 108-1 is referenced by a corresponding entity for use by the entity in performing an operation. An entity referencing an object can refer to the entity accessing the object and using the object in some manner.

In some examples, a reference counter starts at a value of 0, which indicates that no entities have referenced the corresponding object. A first access of the object by an entity would cause the reference counter to increment to a value of 1, which indicates that there is currently one access of the object. Another access of the corresponding object by an entity would cause the reference counter to increment again to a value of 2, which indicates that there is currently two accesses of the corresponding object. When an entity has completed an operation with respect to the corresponding object, the entity can submit a request to decrement the reference counter.

The foregoing assumes that the reference counter starts at a low value (e.g., 0) and increments to a higher value with each access of the corresponding object. In other examples, the reference counter can start at a maximum value and is decremented with each access of the corresponding object. Generally, a reference counter in the reference field 124-$i$ of an entry header 106-$i$ is advanced (either incremented or decremented depending on the implementation) with each access of the corresponding object. When an entity has completed an operation with respect to the corresponding object, the entity can cause the reference counter to retreat (e.g., decrement or increment depending on the implementation).

As further shown in the example of FIG. 1, the object 108-2 is a free object that has not yet been allocated by any entity. The reference field 124-2 in the entry header 106-2 includes a next index value that points to the next entry header associated with a free object. The next index value includes the index of another entry header that is associated with a free object.

In the example of FIG. 1, the next index value in the reference field 124-2 points to the entry header 106-5, which is associated with a free object 108-5. The object 108-6 is also a free object, and thus, the next index value in the reference field 124-5 in the entry header 106-5 points to the entry header 106-6.

The objects 108-3 and 108-4 are allocated objects, and thus, the reference fields 124-3 and 124-4 in the respective entry headers 106-3 and 106-4 contain corresponding reference counters for tracking how many references have been made to the respective objects 108-3 and 108-4.

The table header 104 includes various information elements, including a first free index field 142, which contains an index value that points to a first entry header that is associated with a free object (an entry header associated with a free object is referred to as a "free entry header"). In the example, the first entry header associated with a free object is the entry header 106-2. Together, the index value in the first free index field 142 along with the next free index values in the reference fields 124-2, 124-5, and 124-6 define a linked list of free entry headers. The order of the free entry headers in the linked list is based on the index values in the first free index field 142 and the next index values in the reference fields 124-2, 124-5, and 124-6. The index values in the first free index field 142 specifies the starting free entry header in the list. The list of free entry headers is linked in the sense that each free entry header is linked to a subsequent free entry header using the respective next index value.

The remaining information elements of the table header 104 are discussed further below.

In some examples, the unique value 126-i in an entry header 106-i can be a random number that changes with each allocation of the corresponding object 108-i. For example, the unique value 126-i can be implemented as a random number generator to generate a random number with each allocation of the corresponding object 108-i. The use of the unique value 126-i is to prevent different allocations of the corresponding object 108-i resulting in the same object handle for the corresponding object 108-i.

An "object handle" (or more simply, a "handle") can refer to a value that contains information that can be used to derive a pointer to an object. A "pointer" refers to a value that represents a storage location, either a logical storage location or a physical storage location. In some examples, the object handle is based on a combination (e.g., a concatenation or other type of combination) of an index to the entry header 106-i and the unique value 126-i.

The object handle is used by the entities to access the corresponding object 108-i. For example, when submitting a request to access an object, an entity can provide the respective object handle as an input.

The object handle is returned to a first entity that requested allocation of the corresponding object, and this object handle can be passed from the first entity to a second entity for the second entity to use in accessing the corresponding object. The second entity can in turn pass the object handle to a further entity. In this way, for a workflow involving multiple entities in which a shared object (shared by the multiple entities) is accessed, the object handle of the shared object can be passed among the multiple entities (starting with the entity that requested allocation of the shared object).

In the example of FIG. 1, it is assumed that the entity 102-1 has been provided with an object handle 103-1 that refers to the entry header 106-1, and the entity 102-n has been provided with an object handle 103-n that refers to the entry header 106-4.

The drain indicator 130-i in an entry header 106-i can indicate whether or not draining has been requested for the corresponding object 108-i. "Draining" an object can refer to a process by which new requests to access the object are denied, so that existing accesses of the object can be drained, i.e., entities can dereference the object as the entities complete their operations with respect to the object. Each dereference of the object causes the corresponding reference counter in the reference field 124-i to retreat (e.g., decrement). Once the reference counter has been decremented to 0 or 1, then the entity that initially requested allocation of the corresponding object 108-i can free the corresponding object 108-i, at which point the entry header 106-i indicates that the corresponding object 108-i is free (the allocation indicator 128-i is set to an inactive state, and the reference field 124-i is updated to store a next index value that points to the next free entry header.

The drain indicator 130-i can be implemented using a bit or a number of bits. If the drain indicator 130-i is set to an active state (e.g., a logical "1"), then that indicates the corresponding object 108-i is being drained. On the other hand, if the drain indicator 130-i is set to an inactive state (e.g., a logical "0"), then that indicates the corresponding object 108-i is not being drained (i.e., new requests to access the corresponding object 108-i are allowed).

The object table 100 is associated with various routines that can be invoked by the entities 102-1 to 102-n, where the routines can be invoked for allocating or at deallocating an object, referencing or dereferencing an object, draining an object, and so forth. In some examples, the routines are part of an application programming interface (API) 132 that includes various API routines 134 invocable by the entities 102-1 to 102-n. Examples of the API routines 134 are discussed further below.

In addition to the first free index field 142, the table header 104 further includes other information elements.

One such information element is a drain indicator 136 (which can be implemented using one bit or multiple bits). The drain indicator 136 when set to an inactive state allows for allocations of the objects to be performed using the object table 100. However, if the drain indicator 136 is set to an active state, then further allocations of objects using the object table 100 would be denied.

The information elements of the table header 104 also include a number of free entries field 140 for indicating a number of entry headers in the object table 100 that are associated with free objects (i.e., those objects that have not yet been allocated). Note that if the number of free entries field 140 has a value of 0, then that indicates no further objects are available and any further requests for allocation of objects received by the object table 100 are denied.

The information elements of the table header 104 also include a unique value field 138, which contains a unique value that can be used to address an ABA problem. In some examples, the unique value field 138 contains a random number.

An ABA problem occurs when a first entity reads a first value (referred to as "value A") from a shared memory location. After this first read by the first entity, a second entity modifies the shared memory location to a second value (referred to as "value B"). The second entity then changes value B back to value A. When this first entity again reads the shared memory location, the first entity again reads value A in this second read. Thus, from the perspective of the first entity, the value of the shared memory location has not changed, and an indication is provided that nothing has changed in the value of the shared memory. The behavior of the first entity may not be correct due to the hidden modification in the shared memory location by the second entity. The ABA problem can be encountered when using a lock-free data structure, such as the object table 100 of FIG. 1. If an item is removed from a list (such as a list of free entry headers discussed above), deleted, and then a new item is allocated and added to the list, the allocated item may be at the same memory location as the deleted item. A pointer to the new item is thus equal to the pointer to the old item, which can cause an ABA problem.

By adding the unique value to the table header 104, the ABA problem can be resolved. Any update of the object table 100 (e.g., an update of any of the entry headers 106-1 to 106-6) will cause an update of the unique value, which provides an indication to an entity accessing an object that something has changed.

The following describes some examples of the routines 134 that are accessible by entities for allocating or deallocating objects, referencing or dereferencing objects, or performing other operations with respect to objects. Although specific example routines are described, it is noted that in other examples, additional or alternative routines can be used.

An AllocObj( ) routine is called by an entity to allocate an object 108-$i$ that is referred to by the object table 100. The object that is allocated in response to the AllocObj( ) routine is the next free object referred to by the linked list of free entry headers in the object table 100. The AllocObj( ) routine can perform the following tasks: 1) allocates a new object and returns a pointer to the new object; 2) returns an object handle for the object to the entity, where the object handle is based on a combination of the index to the entry header 106-$i$ and the unique value 126-$i$ (the object handle can be passed by the entity to another entity); 3) changes the reference field 124-$i$ from a next index value (that refers to a next free entry header) to a reference counter; and 4) changes the state of the allocation indicator 128-$i$ from an inactive state to an active state (to indicate that the object 108-$i$ has been allocated). The update of the reference field 124-$i$ and the allocation indicator 128-$i$ is performed in a single atomic operation on the entry header 106-$i$.

The AllocObj( ) routine does not increment the reference counter, so that the reference counter is set to the value 0. The AllocObj( ) routine can be invoked by an entity to pre-allocate the object for later use.

An AllocObjAndIncRef( ) routine performs the same operations as the AllocObj( ) routine, except that the AllocObjAndIncRef( ) routine also increments the reference counter in the reference field 124-$i$ to indicate that that an entity (the entity that called the AllocObjAndIncRef( ) routine) is referencing the object 108-$i$ allocated by the AllocObjAndIncRef( ) routine. Note that the incrementing of the reference counter is performed atomically along with the other updates of the allocation operation noted above for the AllocObj( ) routine. The AllocObjAndIncRef( ) routine is called by an entity that wishes to use the allocated object, and the AllocObjAndIncRef( ) routine also returns the object handle to the allocated object.

A LookupAndIncRef( ) routine can be called by an entity to look up (access) an object using a specific object handle that was returned by a previous allocation of the object. Note that the lookup of the object can be performed by the entity that requested the allocation of the object, or by another entity to which the object handle has been passed. The object handle is passed as an input with the call of the LookupAndIncRef( ) routine.

The call of the LookupAndIncRef( ) routine fails if the object handle has been deregistered (due to deallocation of the object) or marked as draining (the drain indicator 130-$i$ of the respective entry header 106-$i$ is set to an active state). If the call of the LookupAndIncRef( ) routine fails, then a null pointer can be returned to the entity that called the routine. If the call of the LookupAndIncRef( ) routine does not fail, then the reference counter in the respective entry header 106-$i$ is incremented. The update of the reference counter is performed atomically with the access of the remaining information elements of the respective entry header 106-$i$ in a single atomic operation.

A DecRef( ) routine can be called by an entity when the entity has completed its operation on the object referred to by an object handle. The object handle is passed as an input in the call of the DecRef( ) routine.

A TryFreeObj( ) routine can be called by the entity that requested allocation of an object associated with an object handle. The object handle is passed as an input with the call of the TryFreeObj( ) routine. This routine attempts to free the object associated with the object handle. If the reference counter has a value less than or equal to 1, then the TryFreeObj( ) routine frees the object by performing the following tasks: 1) the reference field 124-$i$ of the entry header 106-$i$ associated with the object 108-$i$ corresponding to the object handle is replaced with a next index value to point to a next free entry header; 2) other entry headers associated with free objects are updated such that the respective next index values form a free list that includes the entry header associated with the object that is being freed by the TryFreeObj( ) routine; 4) the allocation indicator 128-$i$ is changed from an inactive state to an active state; and 5) the unique value 126-$i$ is updated (such as to a new random number). The foregoing updates can be performed in a single atomic operation on the entry header 106-$i$. The TryFreeObj( ) routine also updates the table header 104 to point to a new first free index 142 if appropriate (e.g., the object being freed by the TryFreeObj( ) routine would be the first free object in the list). In addition, the TryFreeObj( ) routine updates the number of free entries field 140 to refer to the updated number of free entry headers.

If the TryFreeObj( ) routine is unable to free the object, such as because the reference counter in the reference field 124-$i$ of the entry header 106-$i$ is greater than 1, then the TryFreeObj( ) routine starts a draining process, by setting the drain indicator 130-$i$ of the entry header 106-I to an active state.

A StartDrain( ) routine can be called by an entity to start draining an object 108-$i$ referred to by an object handle passed as an input with the call of the routine. The entry header 106-$i$ is modified by the routine to change the drain indicator 130-$i$ from an inactive state to an active state. Once the draining indicator 130-$i$ is set to an active state, new requests to access the object 108-$i$ (such as by calls of the LookupAndIncRef( ) routine) are denied, so the reference counter in the reference field 124-$i$ can no longer be incremented.

The ability to drain an object can be used to address the issue of an entity stopping, going offline, or restarting during a workflow (such as due to the entity crashing), which can lead the entity to drop references to the shared object. By being able to drain a shared object of the workflow, techniques or mechanisms according to some examples are able to prevent the restarted entity from obtaining an access of the shared object when the restarted entity is restarted.

A StopNewAllocs( ) routine can be called to prevent further allocations of objects using the object table 100. In response to a call of the StopNewAllocs( ) routine, the drain indicator 136 in the table header 104 is changed from an inactive state to an active state.

In accordance with some examples of the present disclosure, the use of the object table 100 (or other data structure) to manage the allocation and referencing of objects allows for access of a shared object without blocking and without having to acquire locks. An entity can stop further accesses of a shared object (by calling either the TryFreeObj( ) routine or the StartDrain( ) routine) while still allowing current accesses of the shared object to complete. Multiple entities are allowed to access the shared object in an efficient manner (by making a call of a routine associated with the object able 100 and updating the corresponding entry header 106-*i*). In addition, the shared object is not invalidated so long as pending accesses remain (by waiting for the pending accesses to complete before deallocating the shared object). An attempted access of an object that has been marked draining (such as by either the TryFreeObj( ) routine or the StartDrain( ) routine) returns a specified null pointer so that the requesting entity can determine that further access of the object is not allowed. This avoids an undefined behavior due to a failed access of the object. Once an object is freed, the object can be re-allocated with a new object handle (due to a new unique value 126-*i*) to avoid the same object handle being used in different allocations of the object.

Figure 2:
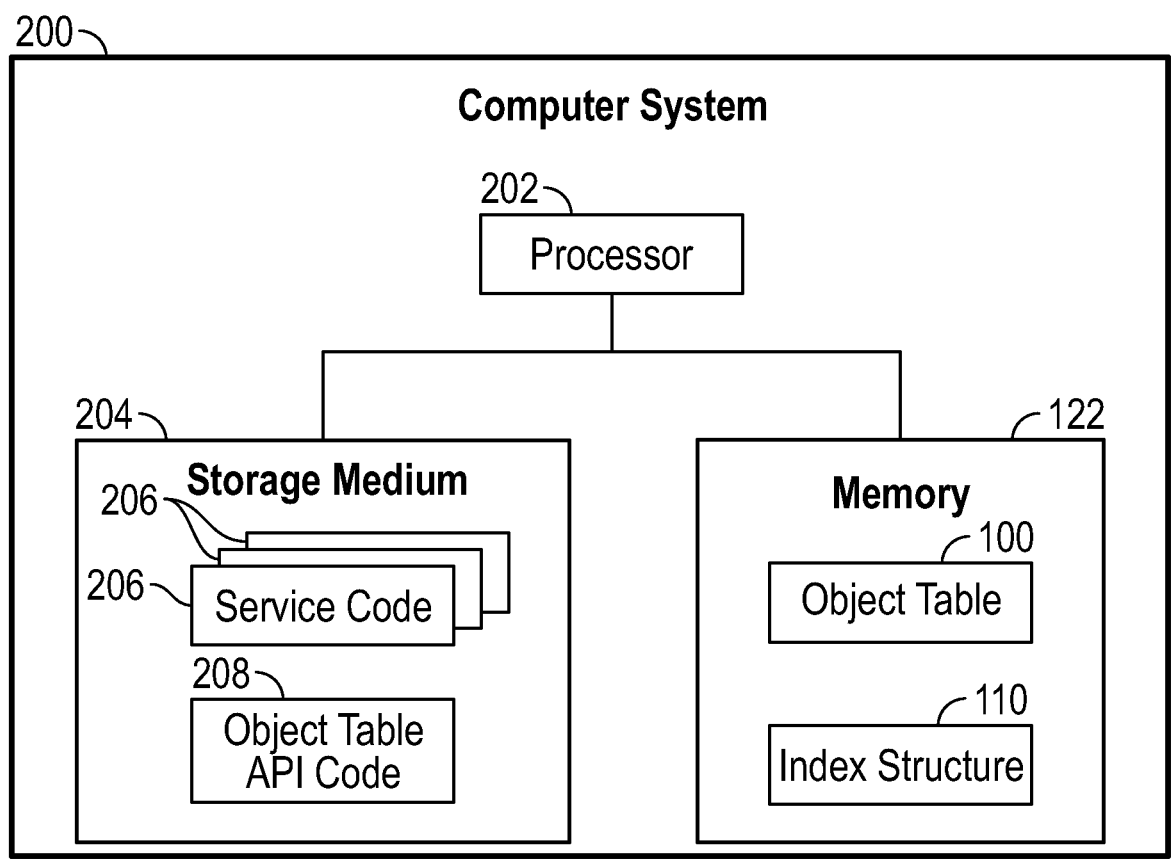
FIG. 2 is a block diagram of a computer system according to some examples.

FIG. 2 is a block diagram of a computer system 200 according to some examples. The computer system 200 includes a processor 202 (or multiple processors). A processor can include a microprocessor, a core of a multi-core microprocessor, a microcontroller, a programmable integrated circuit, a programmable gate array, or another hardware processing circuit.

The computer system 200 also includes the memory 122 that stores the object table 100 and the index structure 110 discussed above, according to some examples.

The computer system 200 also includes a non-transitory machine-readable or computer-readable storage medium 204, which can store data and machine-readable instructions. The machine-readable instructions stored in the storage medium 204 include multiple service codes 206 that correspond to multiple different services that can be executed on the processor 202. The services corresponding to the service codes 206 are examples of the entities discussed above.

The storage medium 204 also stores an object table API code 208, which when invoked presents the API 132 containing the routines 134 (FIG. 1) that can be invoked by entities, including services corresponding to the service codes 206. The invoked routines can perform operations with respect to the objects referenced by the object table 100.

Figure 3:
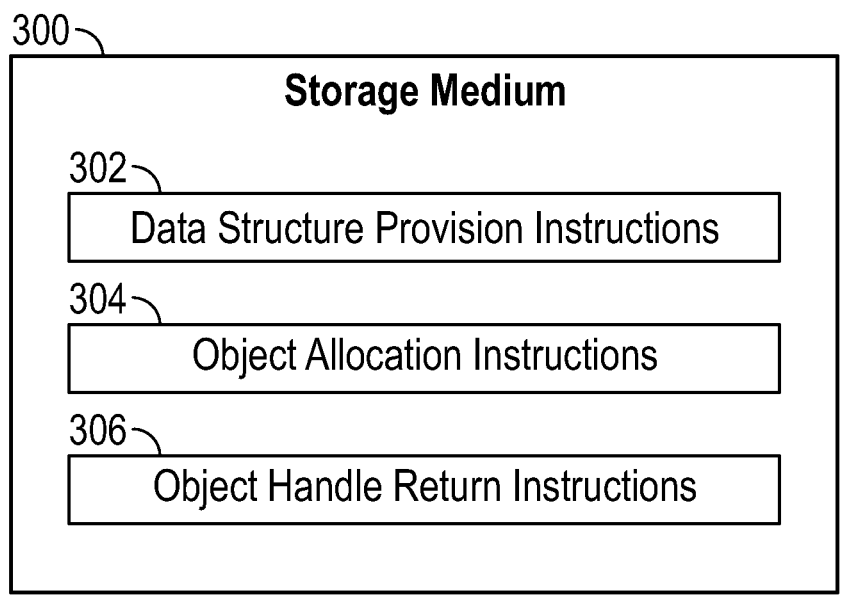
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks.

The machine-readable instructions include data structure provision instructions 302 to provide a data structure (e.g., the object table 100 of FIG. 1) containing an entry (e.g., entry header 106-*i* of FIG. 1) to store information for an object for sharing by a plurality of entities (e.g., 102-1 to 102-*n* of FIG. 1).

The machine-readable instructions include object allocation instructions 306 to allocate the object to a first entity of the plurality of entities based on an atomic access of the entry, where the atomic access updates, in one operation (e.g., a single atomic operation), multiple information elements in the entry relating to allocation of the object.

The machine-readable instructions include object handle return instructions 308 to return, to the first entity, a handle to the object, the handle based on a value in the entry.

In some examples, the machine-readable instructions can receive a lookup operation (due to a call of the LookupAndIncRef( ) routine, for example) from a second entity of the plurality of entities, where the lookup operation is for accessing the object and uses the handle received by the second entity from the first entity.

In some examples, the entry of the data structure includes a count (e.g., reference counter shown in FIG. 1) advanced (e.g., incremented or decremented) responsive to the lookup operation, where the count represents a quantity of accesses of the object (i.e., how many accesses are currently active with respect to the object).

In some examples, the machine-readable instructions cause retreat (decrement or increment) of the count in the entry responsive to an entity no longer accessing the object (such as responsive to a DecRef( ) call).

In some examples, the machine-readable instructions are responsive to a request to free the object (e.g., a call of the TryFreeObj( ) routine) to check a value of the count, and deny the request to free the object responsive to the value of the count indicating an active access of the object (e.g., the reference counter of the respective entry header 106-*i* has a value greater than 1).

In some examples, the machine-readable instructions are to, responsive the request to free the object and to the value of the count indicating an active access of the object, prevent a new access of the object (such as by setting the drain indicator 130-*i* of the respective entry header 106-*i* to an active state).

In some examples, the machine-readable instructions are to, responsive to the request to free the object, free the object responsive the value of the count indicating no active access of the object, and update the information elements of the entry to indicate that the object is unallocated.

In some examples, the machine-readable instructions are to, responsive to a request to drain accesses of the object (e.g., a call of the StartDrain( ) routine), prevent a new access of the object.

In some examples, the machine-readable instructions are to, responsive to the request to drain accesses of the object, change a drain indicator in the entry from a first value to a second value, the drain indicator when set to the second value indicating that the accesses of the object are to be drained, and the drain indicator when set to the first value indicating that a new access of the object is permitted.

In some examples, the data structure includes a header that includes a first indicator (e.g., the number of free entries field 140 of FIG. 1) of a quantity of entries of the data structure that are associated with objects that have not been allocated, and a second indicator (e.g., the first free index field 142 of FIG. 1) that points to an entry of the data structure that is associated with an object that has not been allocated.

Figure 4:
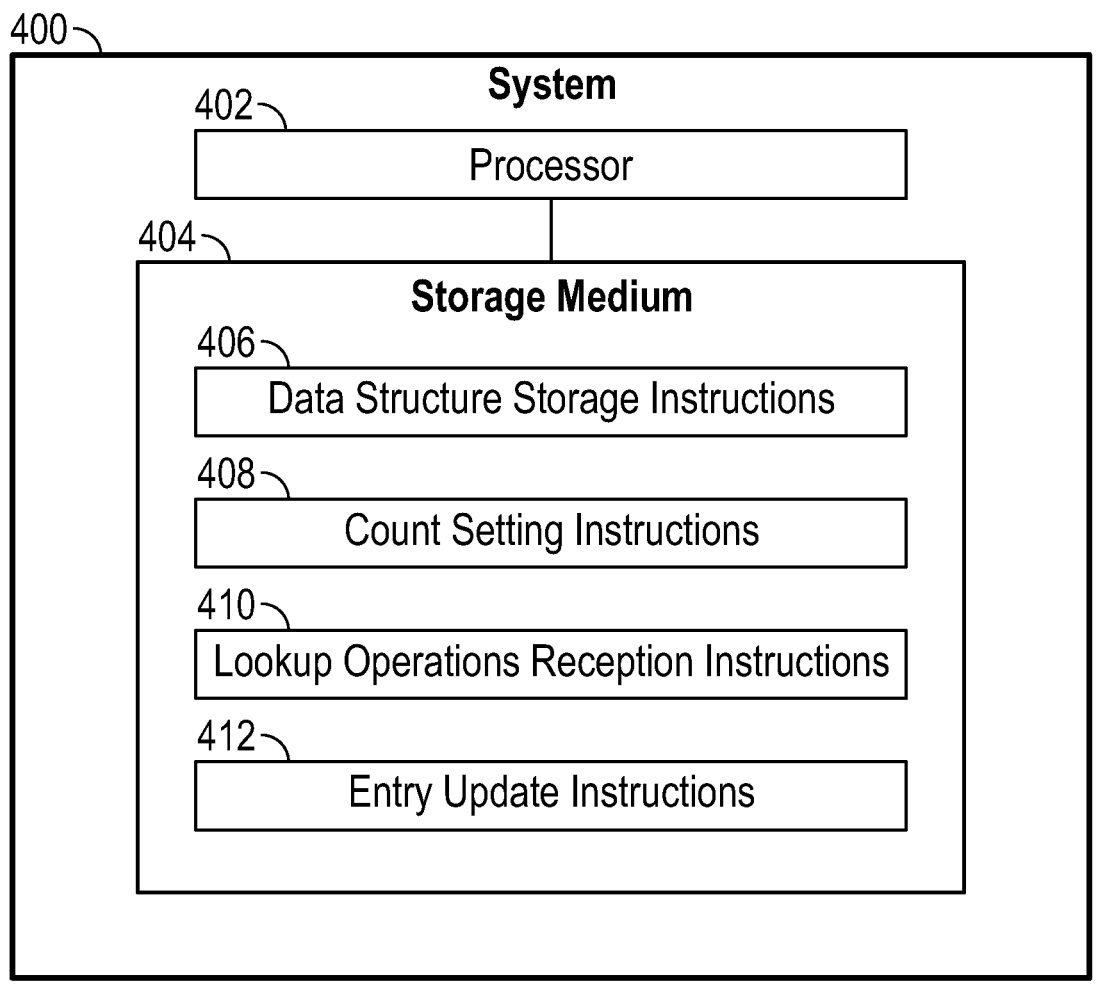
FIG. 4 is a block diagram of a system according to some examples.

FIG. 4 is a block diagram of a system 400 that includes a processor 402 and a non-transitory storage medium 404 storing machine-readable instructions executable on the processor 402 to perform various tasks. Machine-readable instructions executable on a processor can refer to the instructions executable on a single processor or the instructions executable on multiple processors.

The machine-readable instructions stored in the storage medium 404 include data structure storage instructions 406 to store a data structure including a plurality of entries, where a first entry of the plurality of entries contains first information indicating that a first object is unallocated, and a second entry of the plurality of entries contains second information indicating that a second object has been allocated and is for sharing by a plurality of entities.

The machine-readable instructions include count setting instructions 408 to set a count in the second entry that indicates a quantity of active accesses of the second object.

The machine-readable instructions include lookup operation reception instructions 410 to receive a lookup operation from a first entity for accessing the object, the lookup operation using a handle received by the first entity from a second entity that has allocated the object, where the handle is based on a value in the second entry.

The machine-readable instructions include entry update instructions 412 to, responsive to the lookup operation, update the second entry using an atomic access.

Figure 5:
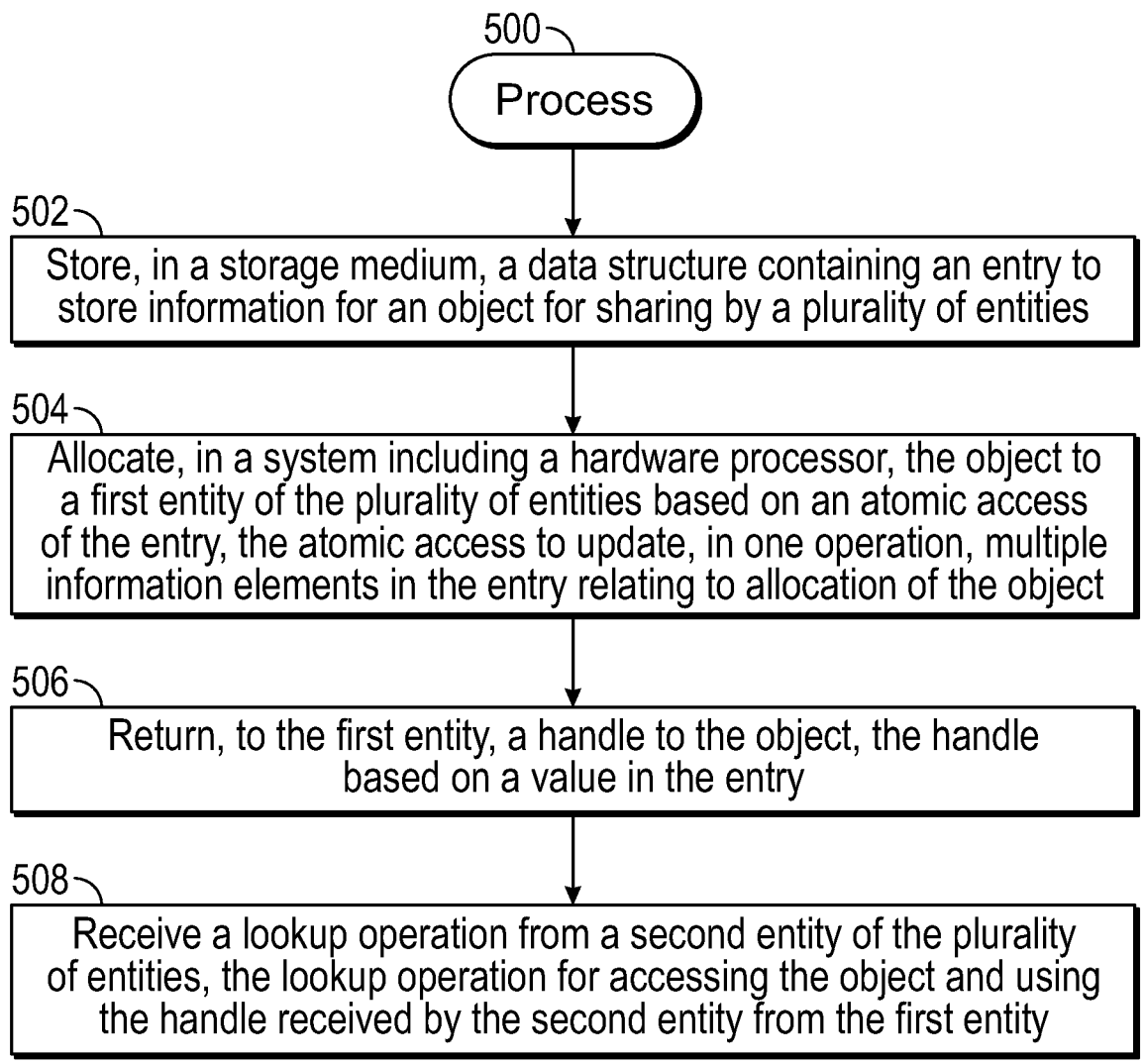
FIG. 5 is a flow diagram of a process according to some examples.

FIG. 5 is a flow diagram of a process 500 that can be performed in a computer system (e.g., the computer system 200 of FIG. 2).

The process 500 includes storing (at 502), in a storage medium, a data structure containing an entry to store information for an object for sharing by a plurality of entities.

The process 500 includes allocating (at 504), in a system including a hardware processor, the object to a first entity of the plurality of entities based on an atomic access of the entry, the atomic access to update, in one operation, multiple information elements in the entry relating to allocation of the object.

The process 500 includes returning (at 506), to the first entity, a handle to the object, the handle based on a value in the entry.

The process 500 includes receiving (at 508) a lookup operation from a second entity of the plurality of entities, the lookup operation for accessing the object and using the handle received by the second entity from the first entity.

A storage medium (e.g., the storage medium 204 of FIG. 2 or the storage medium 300 of FIG. 3) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

provide a data structure containing a first entry to store information for a first object for sharing by a plurality of entities;

allocate the first object to a first entity of the plurality of entities based on an atomic access of the first entry, the atomic access to update, in one operation, multiple information elements in the first entry relating to the allocation of the first object to the first entity, wherein the updated multiple information elements in the first entry indicate that the first object has been allocated, and wherein the data structure further contains a second entry to store information for a second object, and the information in the second entry indicates that the second object is unallocated to any entity;

return, to the first entity, a handle to the first object, the handle based on a value in the first entry and containing information from which a representation of a storage location of the first object is derivable; and access the first object at the storage location in response to a request comprising the handle.

2. The non-transitory machine-readable storage medium of claim 1, wherein the instructions upon execution cause the system to:

receive a lookup operation from a second entity of the plurality of entities, wherein the second entity received the handle from the first entity, and the lookup operation is for accessing the first object using the handle received by the second entity from the first entity.

3. The non-transitory machine-readable storage medium of claim 2, wherein the first entry comprises a count advanced responsive to the lookup operation, the count representing a quantity of accesses of the first object.

4. The non-transitory machine-readable storage medium of claim 3, wherein the instructions upon execution cause the system to:

cause retreat of the count in the first entry responsive to an entity no longer accessing the first object.

5. The non-transitory machine-readable storage medium of claim 3, wherein the instructions upon execution cause the system to:

responsive to a request to free the first object:
check a value of the count, and
deny the request to free the first object responsive to the value of the count indicating an active access of the first object.

6. The non-transitory machine-readable storage medium of claim 5, wherein the instructions upon execution cause the system to:

responsive to the request:
free the first object responsive to the value of the count indicating no active access of the first object, and update the multiple information elements of the first entry to indicate that the first object is unallocated.

7. The non-transitory machine-readable storage medium of claim 5, wherein the instructions upon execution cause the system to:

responsive to the value of the count indicating an active access of the first object, prevent a new access of the first object.

8. The non-transitory machine-readable storage medium of claim 1, wherein the instructions upon execution cause the system to:

responsive to a request to drain accesses of the first object, prevent a new access of the first object.

9. The non-transitory machine-readable storage medium of claim 8, wherein the instructions upon execution cause the system to:

responsive to the request to drain accesses of the first object, change a drain indicator in the first entry from a first value to a second value, the drain indicator when set to the second value indicating that the accesses of the first object are to be drained, and the drain indicator when set to the first value indicating that a new access of the first object is permitted.

10. The non-transitory machine-readable storage medium of claim 1, wherein the handle is based on a combination of the value and an index to the first entry.

11. The non-transitory machine-readable storage medium of claim 10, wherein the value comprises a random number.

12. The non-transitory machine-readable storage medium of claim 1, wherein the second entry contains a pointer to a third entry of the data structure, the third entry to store information for a third object, wherein the information in the third entry indicates that the third object is unallocated, and wherein the first entry contains a count representing a quantity of accesses of the first object.

13. The non-transitory machine-readable storage medium of claim 12, wherein the data structure comprises a header that comprises:
a first indicator of a quantity of entries of the data structure that are associated with objects that have not been allocated, and
a second indicator that points to an entry of the data structure that is associated with an object that has not been allocated.

14. The non-transitory machine-readable storage medium of claim 1, wherein the atomic access is lock-free and does not block.

15. The non-transitory machine-readable storage medium of claim 1, wherein the instructions upon execution cause the system to:
derive a pointer to the first object based on the handle, wherein the representation of the storage location of the first object comprises the pointer.

16. A system comprising:
a processor; and
a non-transitory storage medium storing instructions executable on the processor to:
store a data structure comprising a plurality of entries, wherein a first entry of the plurality of entries contains first information indicating that a first object is unallocated, and a second entry of the plurality of entries contains second information indicating that a second object has been allocated and is for sharing by a plurality of entities,
set a count in the second entry that indicates a quantity of active accesses of the second object,
receive a lookup operation from a first entity for accessing the second object, the lookup operation using a handle received by the first entity from a second entity that has allocated the second object, wherein the handle is based on a value in the second entry, and
responsive to the lookup operation, update the second entry using an atomic access.

17. The system of claim 16, wherein the update of the second entry comprises updating the count.

18. A method comprising:
storing, in a storage medium, a data structure containing an entry to store information for an object for sharing by a plurality of entities, wherein the entry comprises a count advanced responsive to a lookup of the object, the count representing a quantity of accesses of the object;
allocating, in a system comprising a hardware processor, the object to a first entity of the plurality of entities based on an atomic access of the entry, the atomic access to update, in one operation, multiple information elements in the entry relating to allocation of the object;
returning, to the first entity, a handle to the object, the handle based on a value in the entry and containing information from which a representation of a storage location of the object is derivable;
accessing the object at the storage location in response to a request comprising the handle; and
responsive to a request to free the object:
check a value of the count, and
deny the request to free the object responsive to the value of the count indicating an active access of the object.

19. The method of claim 18, comprising:
responsive to the denying of the request to free the object:
setting a drain indicator in the entry, and starting a draining process indicated by the drain indicator, the draining process denying new requests to access the object.

20. The method of claim 18, comprising:
retreating the count in the entry responsive to an entity no longer accessing the object.

* * * * *